Sept. 24, 1940. E. N. SLAVIK 2,215,621
SAFETY TOOL CHUCK
Filed Aug. 2, 1939
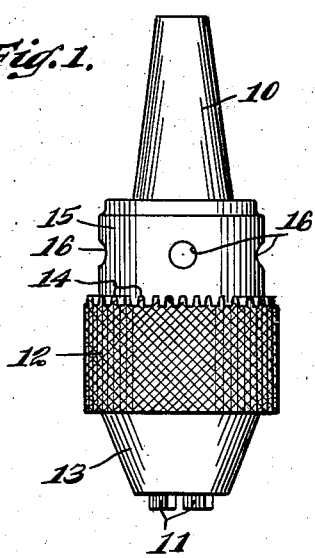
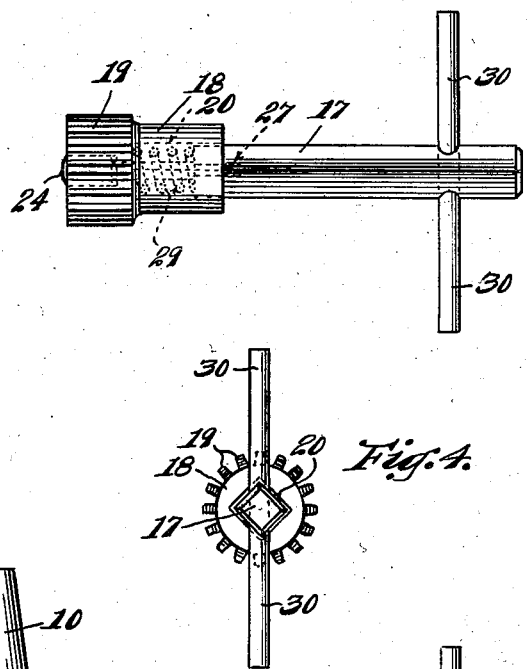
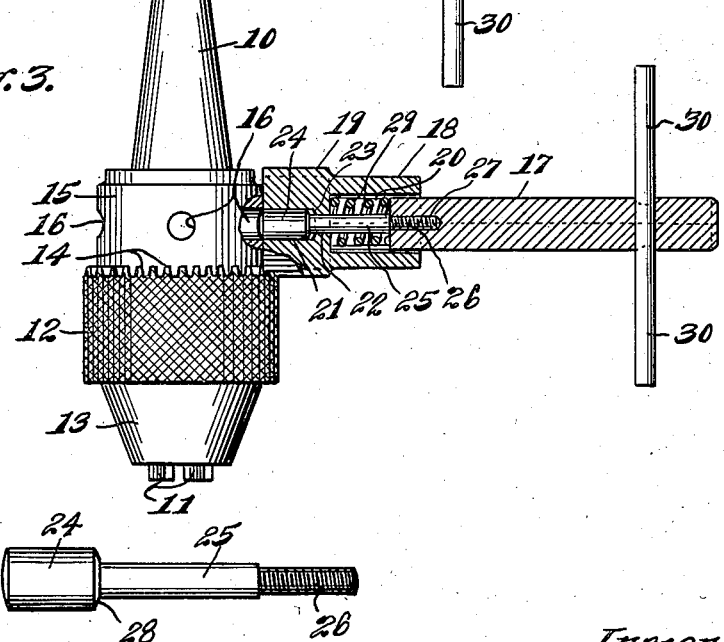
Inventor:
Edwin N. Slavik,
By Joshua R. H. Potts
his Attorney.

Patented Sept. 24, 1940

2,215,621

UNITED STATES PATENT OFFICE 2,215,621

SAFETY TOOL CHUCK

Edwin N. Slavik, Chicago, Ill.

Application August 2, 1939, Serial No. 287,878

5 Claims. (Cl. 279—1)

This invention relates to safety tool chucks such as used in connection with drills or other machines in metal working or the like.

More particularly the invention has reference to a safety tool or key for operating the gripping jaws of the chuck which holds the tool or work to engage or release the same, and the object of the invention is to provide a novel safety tool or key designed to prevent accidents in tightening or releasing a tool bit or the work in a chuck due to premature starting of the machine causing the tool or key to catch in the clothing of a machinist or operator or striking an arm or other part of the body and causing serious accidents. This is accomplished by causing the automatic release of the tool or key from the prematurely rotated chuck thereby preventing or reducing accidents and injuries.

Further objects and advantages will appear and be brought out more fully in the following specification, reference being had to the accompanying drawing, in which:

Fig. 1 is an elevation of a chuck equipped in accordance with the invention;

Fig. 2 is an elevation of the chuck operating tool or key;

Fig. 3 is a sectional elevation showing the tool applied to the chuck;

Fig. 4 is an end elevation of the tool; and

Fig. 5 is an elevation of the tool plunger.

Referring to the drawing, the chuck body may have a socket or a shank 10 for attachment to the machine by reception of the machine shank or for engaging the socket of the machine, such as the spindle of a drill press or lathe or the like. The chuck has the jaws 11 arranged with inclined or camming surfaces as usual and adapted to be contracted for engaging and firmly gripping the tool or work or expanded and separated for releasing the same, or for receiving and holding a bit. These jaws are operated by means of a knurled sleeve 12 adapted to be turned in either direction for tightening the chuck jaws on the shank of the bit or releasing the same through the medium of an inclined, tapered or camming portion 13. This sleeve has a rack gear or teeth 14 at its upper or lower edge, depending upon the type of the chuck employed, and the adjacent portion 15 of the stationary body of the chuck is provided with a plurality of small sockets 16 extending radially from the periphery and preferably equidistantly spaced. These sockets form a bearing for a tool or key 17 designed to turn the knurled sleeve 12 to tighten the jaws of the chuck on the tool shank or work or to release the same as previously described.

The safety tool has a squared shank 17 which fits in a sleeve 18 having a pinion 19, the sleeve having a squared socket 20 extending to the pinion and telescopically receiving the shank to slide therein, but so as to cause both to turn together.

A bore 21 is provided in the center axis of the pinion 19 at the outer or forward portion thereof and a reduced bore 22 at the inner or back portion forming a shoulder 23 limiting the inward axial movement of a pin or plunger 24 when moved out of a socket 16. To do this the plunger 24 is normally retracted and has a coacting inwardly facing shoulder 28 opposing the shoulder 23 and a reduced shank or stem 25 threaded at 26 and adjustable in a threaded socket or bore 27 in the inner end of the shank 17. An expansible coil spring 29 is fitted in the squared socket 20 between the end wall thereof and the inner end of the shank 17, to force the latter outwardly, the threaded connection serving to permit adjustment of the spring tension. The tool is designed to be turned in any suitable manner as by means of a handle or cross bar 30 extending through a diametrical opening in the outer portion of the shank. Any suitable means may be provided for adjusting the tension of the spring or permitting its replacement, but the construction described is simple and efficient.

In the use of the device, the face of the pinion 19 is placed against the body 15 so that the pin or plunger 24 will align with or engage one of the sockets 16, as shown in Fig. 3 of the drawing and the teeth of the pinion will mesh with the teeth of the rack or gear 14. By pressing in on the handle 30, the shank 17 will move against and compress the spring 29 and at the same time move the pin or plunger 24 outwardly from the bore 21 into the socket. Then by turning the handle 30, and thus the pinion 19, in engagement with the gear 14 of the sleeve 12, the latter will be turned to contract or expand the jaws 11 to tighten the latter on the tool bit or release the same. If the machine, and thus the chuck should be prematurely started, the rotation thereof directing a tangential centrifugal and circumferential movement to the pin or plunger 24 will cause the latter to be forced back into the bore 21, although this will ordinarily happen automatically by release of pressure on the tool handle 30 and the expansion of the spring 29 against the inner end of the shank 17 to force the latter outwardly in the polygonal socket 20 and withdraw the pin or plunger 24 attached to the shank 17 from the socket 16 and into the bore 21. This will release the tool or key and prevent injury instead of permitting the same to be thrown around with the rotating chuck of the machine to cause injury to a worker.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. A key of the class described comprising a sleeve having a pinion for engaging a chuck sleeve gear, a plunger for engaging a socket in the chuck and movable through the sleeve clear of the face thereof, said sleeve having a polygonal socket, a compression spring in the socket around the plunger, a polygonal shank movably engaging the sleeve socket and adjustably connected to the plunger, said spring forcing outwardly on the shank, and a handle on the shank to turn the same.

2. A key of the class described comprising a short sleeve having a pinion for engaging a chuck sleeve gear, a plunger for engaging a radial socket in a stationary chuck body and movable through the sleeve, said sleeve having a polygonal socket, a compression spring in the socket and a polygonal shank movably engaging the sleeve socket and connected to the plunger, said spring forcing outwardly on the shank to normally disengage the plunger from the radial socket and adapted to be forced into the same upon compression of the spring.

3. A safety chuck tool having a sleeve with a pinion for engaging a chuck sleeve gear, a normally retracted chuck engaging member, said chuck engaging member adapted to be pressed into a stationary portion of the chuck to cause the pinion to engage the gear and adapted when released to disengage the chuck engaging member and the pinion.

4. A safety tool for a chuck having releasable gripping jaws and operating means therefor and a socket, comprising a sleeve having means to operatively connect with said operating means and a normally retracted plunger adapted to be pressed into the socket to operatively connect the sleeve with the operating means for actuating the latter.

5. A key of the class described for a chuck having jaws, radial sockets and a rotatable sleeve for actuating said jaws having a gear on one edge normal to the axis thereof, a squared shank, a pinion having a sleeve with a squared socket slidably receiving the shank, a plunger movable in the sleeve and connected to the shank, and an expansible spring in the squared socket forcing outwardly on the shank to normally retract the plunger within the face of the pinion and adapted when the shank is pressed in to project the plunger from the pinion for engaging a radial socket.

EDWIN N. SLAVIK.